B. H. ALVEY & M. U. BERNHEIM.
CONVEYING SYSTEM.
APPLICATION FILED AUG. 3, 1908.

1,250,073.

Patented Dec. 11, 1917.
8 SHEETS—SHEET 1.

Witnesses
Jos. J. Collins
Ruth Stockman Inventors
Benjamin H. Alvey
Morris U. Bernheim
By C. J. Stockman
Attorney

B. H. ALVEY & M. U. BERNHEIM.
CONVEYING SYSTEM.
APPLICATION FILED AUG. 3, 1908.

1,250,073.

Patented Dec. 11, 1917.
8 SHEETS—SHEET 6.

UNITED STATES PATENT OFFICE.

BENJAMIN H. ALVEY AND MORRIS U. BERNHEIM, OF LOUISVILLE, KENTUCKY, ASSIGNORS, BY MESNE ASSIGNMENTS, TO THE ALVEY-FERGUSON COMPANY, OF OAKLEY, OHIO, A CORPORATION OF OHIO.

CONVEYING SYSTEM.

1,250,073.   Specification of Letters Patent.   Patented Dec. 11, 1917.

Application filed August 3, 1908.   Serial No. 446,548.

*To all whom it may concern:*

Be it known that we, BENJAMIN H. ALVEY and MORRIS U. BERNHEIM, citizens of the United States, residing at Louisville, in the county of Jefferson and State of Kentucky, have invented certain new and useful Improvements in Conveying Systems, of which the following is a specification.

This invention relates to certain improvements in systems for conveying packages from one place to another in a brewery or other establishment, and its most particular object is to provide a system which will economically and expeditiously transfer barrels or kegs from racking or other machines to storage bins or wagons, in beer brewing or other establishments, though it is to be understood that the use herein referred to is to be regarded merely as exemplary of what is now considered to be the most important use to which the present system in its entirety may be put and in no wise as restricting the system to such use, it being within the spirit of the invention and intended to be within the scope of the claims, to apply it to any use which it is capable of serving.

The system herein illustrated embodies power conveying-elements and gravity conveying-elements so correlated as conjointly to produce a system having important advantages in the conveyance of barrels, kegs or the like from place to place and the invention consists in the novel features of the system, substantially as hereinafter described and particularly pointed out in the subjoined claims.

The same characters of reference designate the same parts in the several views.

Figures 1, 2:
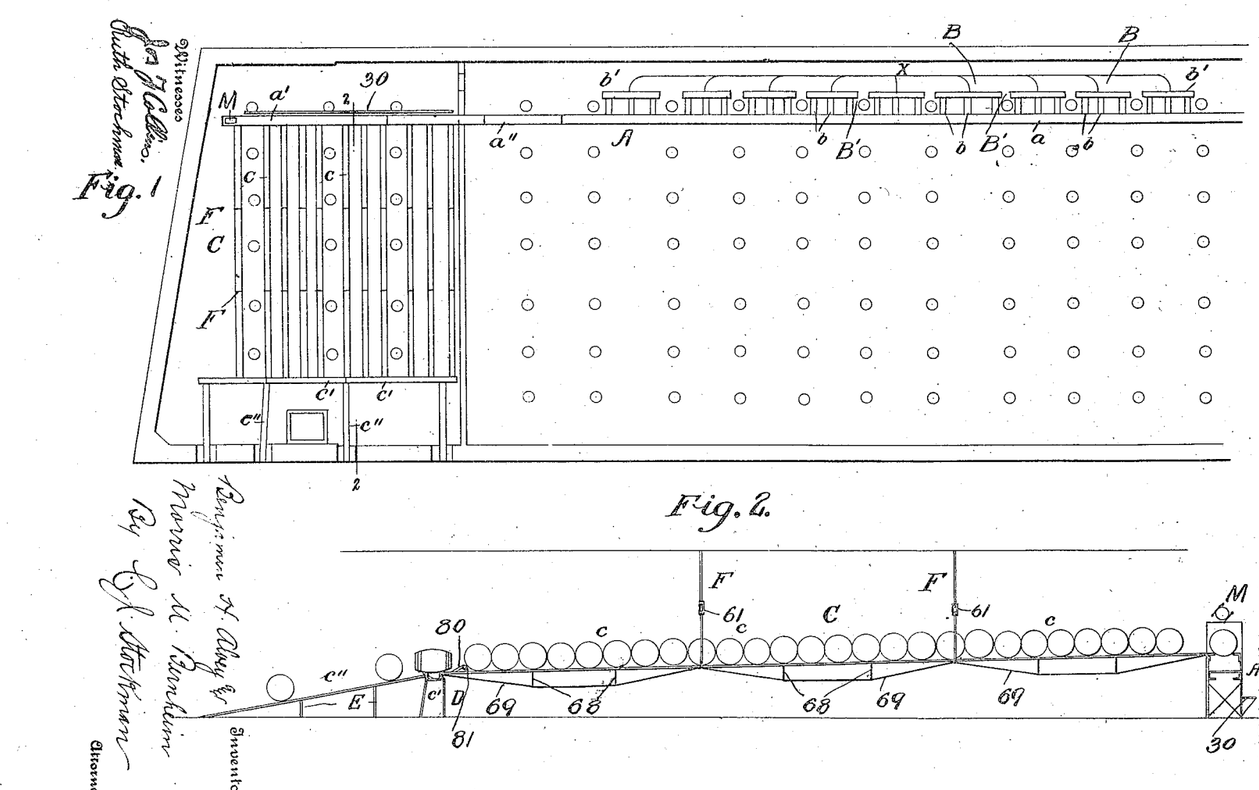
Figure 1 is a diagrammatic view of a brewery stock house provided with a conveying system particularly adapted to transfer the kegs from the racking or filling machines to the storage and shipping departments, with a part of the guard rail of the main conveyer A broken away to disclose the chain traveling beneath the same.
Fig. 2 is a section on the line 2—2 of Fig. 1, particularly showing in side elevation a skid for transferring kegs from the power conveyer to the storage or shipping department.

This invention comprehends generically, as shown in Fig. 1, a system of transferring barrels and the like in a lying position comprising three elements, to wit: (1). a conveyer A—*i. e.*, an element having endless traveling means for moving the barrels, as contradistinguished from a chute, skid or the like along which the barrels are manually pushed or travel by gravity—capable of transporting the barrels in a lying position and maintaining their axes substantially parallel to the direction of motion of the traveling means; (2) one or more loading or delivering elements B arranged at the receiving end of the conveyer A and so correlated therewith that the barrels will be delivered over the side of the conveyer with their axes substantially parallel to the direction of movement of the endless traveling means; and (3) a receiving or discharging element C so correlated with the delivery end of the conveyer as to receive over the side of the latter barrels whose axes are substantially parallel to the direction of the traveling means of the latter; thus making it unnecessary to turn the barrel in transferring it to the conveyer from a delivering element whose delivery end is at an angle to the conveyer and in transferring it from the conveyer to a receiving element whose receiving end is at an angle to the conveyer.

It will be apparent that there may be many different embodiments of the elements hereinbefore generically set forth, and accordingly, we would have it understood that the invention is not restricted to the details of the elements shown in the accompanying drawings. The particular embodiments of the elements, however, are important to the extent that they constitute a most practicable, economical and efficient way of accomplishing the several purposes in view, and hence the invention further comprehend particular embodiments of the several elements and combinations thereof, substantially as hereinafter described and particularly set forth in certain of the subjoined claims.

With reference to such particular embodiment, attention is called to the facts:

(a) that it is greatly preferred to so construct the endless traveling means of the conveyer that it will embody barrel engaging elements of such nature that they will not only carry the barrels disposed thereon in lying position with their axes substantially parallel to the direction of motion of the conveyer but will be so correlated and of such construction that they will effectively maintain the barrels against accidental displacement from such position;

(b) that it is greatly preferred to so construct the delivering and receiving elements B and C that they will act as guides to the barrels rolling thereover and their delivering and receiving ends respectively will effectively hold the barrels with the axes of the latter substantially parallel to the direction of travel of the endless traveling means of the conveyer.

While we have hereinbefore referred to the system as comprising a conveyer A having a delivering element B at its receiving end and a receiving element C at its discharging end, it will be apparent that in some installations it may be desirable to omit the delivering element B and in other installations it may be desirable to omit the receiving element C and these omissions are within the spirit of the invention as defined by certain of the claims.

The particular loading or delivering element B illustrated in the accompanying drawings, includes a skid or skid section $b$ having spaced sides and forming a way whose end adjacent the conveyer A is so arranged with relation to the latter that barrels lying transversely of the way are delivered over the side of the frame of the conveyer A to the barrel carrying means of the latter. In practice, the element B preferably has a plurality of such skids or skid sections $b$ arranged side by side and in approximately the same horizontal plane.

The particular element C, which receives the barrels from the conveyer A, illustrated in the accompanying drawings, includes a skid or skid-section $c$ having spaced sides which form a way whose end is operatively related to a side of the conveyer A at the discharging end of the latter, and over which way barrels lying transversely thereof may be rolled. In practice, the element C preferably includes a plurality of such skids or skid-sections $c$ arranged side by side.

Thus there is one set of delivering ways or sections $b$ at one end of the conveyer A and another set of receiving ways or sections $c$ at the other end of said conveyer. The several ways or sections $b$, while they need not be in precisely the same horizontal plane are yet preferably substantially so arranged, and this is true also of the relation of the several ways or sections $c$ with each other.

The particular traveling means of the conveyer A illustrated in the accompanying drawings, for transporting the barrels with their axes substantially parallel with the motion of said means generically comprises appropriate barrel supports, as the spaced carriers 12, which engage the barrels on opposite sides of the bulge of the latter, and a suitable means, such as endless chains 11 for imparting movement to said supports in the direction of the length of the conveyer A. It will be noted that the correlation of this barrel-carrying means and the ways $b$ and $c$ is such that the barrel-carrying means travels in a direction which is transverse of the ends of the ways contiguous thereto: that is to say, the barrel-carrying means of the conveyer A travels in a direction which is across the delivering end or ends of the way or ways $b$, from side to side of the latter, and similarly across the receiving end or ends of the way or ways $c$ from side to side thereof.

In practice, it is preferred to incline the ways $b$ and $c$, the direction of inclination of the ways $b$ being toward the conveyer A and the direction of inclination of the ways $c$ being away from said conveyer A, whereby barrels may roll gravitally over said ways.

It will be understood that the word "barrel" wherever used in this specification and in the claims is intended to include kegs and other packages of like nature, that is, packages capable of rolling.

The power conveyer A, the several skids $b$ (when more than one are used) forming the loading or delivering element B and the several skids $c$ (when more than one are used) forming the receiving or discharging element C are shown as arranged upon the same floor, it not being the purpose in the illustrated embodiment of the invention to elevate or lower packages from one floor to another: As clearly shown, however, in Fig. 14 a portion of the conveyer A is preferably inclined upward to elevate the barrels in their transfer from the skids $b$ to the skids $c$ in order to deliver the barrels to the skids $c$ at a height such as to afford proper grade for the travel of the barrels gravitally over said skids when the latter are of long length: it being noted in this connection that the skids $b$ illustrated in Fig. 1 are short while the skids $c$ are long. Obviously, it would be within the spirit of the invention to prolong the inclined portion of the conveyer A so as to receive on one floor and deliver on another floor whenever it is expedient or required to do this.

Having thus in a general way set up some of the features of the present invention I will next proceed to further describe the novel arrangement of parts herein illustrated by which a most compact and inexpensive system is produced, especially well adapted economically to transfer filled kegs from racking or filling machines to store rooms or shipping rooms of a brewery, or for transferring barrels in sugar refineries or warehouses; and will thereafter describe the novel structural features of the elements particularly adapting them for conjoint use in the system illustrated.

Figure 14:
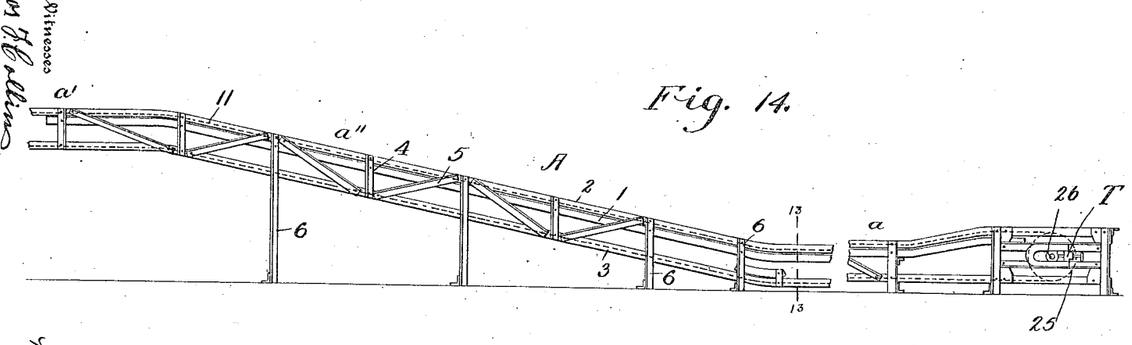
Fig. 14 is a side elevation of the power conveyer broken away between its ends.

The power conveyer A is shown as extending along a stock room from one side to the other thereof. Arranged along the length of the power conveyer and extending at right angles therewith are a series of delivering elements B. Each of these delivering elements is separated from its neighbors by spaces B', forming passageways to the power conveyer A. Each delivering element B is herein shown as composed of three gravity ways $b$ the inner ends of which extend to the side of the power conveyer; and a support $b'$ for the outer ends of the gravity ways $b$ and each element B leads from a racking machine, arranged at the place designated X, to the edge of the power conveyer A. The power conveyer A may be of any length and, as shown in Fig. 14, is composed of what will be arbitrarily termed a receiving section $a$, a discharging section $a'$ and an elevating section $a''$ arranged between the receiving and discharging sections. The receiving and discharging sections or ends are approximately horizontal and the elevating section $a''$ in the illustrated system is inclined upward and of a height merely sufficient to permit the discharging element C hereinbefore referred to to have the inclination or grade requisite to permit packages to move thereon by gravity.

This discharging element is composed of a series of inclined ways $c$, each of which is connected with or taps the side of the discharging end of the power conveyer and extends thence to a second way $c'$ which connects the outer ends of all the ways $c$ with each other and is itself connected with or tapped at intervals by other ways $c''$ which lead to any desired places or rooms, as, for example, to shipping or storing rooms or places, or to wagons. Each way $c$ $c'$ and $c''$ is preferably made in sections, variously supported, as hereinafter described.

It is not essential that any of the elements B or C be connected with the power conveyer A in the sense of being secured thereto, but it is essential that they be connected thereto in the sense of being arranged to deliver or receive packages to or from the latter: nor is it essential that the receiving and discharging sections be actually "horizontal", but merely approximately or relatively so, the term being used in contradistinction to a vertical or approximately vertical position thereof.

In a general way it may be stated that an attendant stationed at a racking machine, for example, places a filled keg or barrel on the contiguous delivering element B, down a way or section $b$ of which it rolls to the power conveyer A; rolling over the side of the latter and upon a moving carrier or carriers thereof (hereinafter described), without being turned, it is conveyed to the discharging end, where again without being turned it is rolled off sidewise therefrom and onto the proper section or way $c$ of the discharging element C by an attendant stationed at the discharging end of the power conveyer; rolling down this way $c$ and onto the way $c'$ it is turned by an attendant and travels on the way $c'$ to the proper way $c''$ where it is again turned and rolls down the latter to the place intended therefor.

Figure 13:
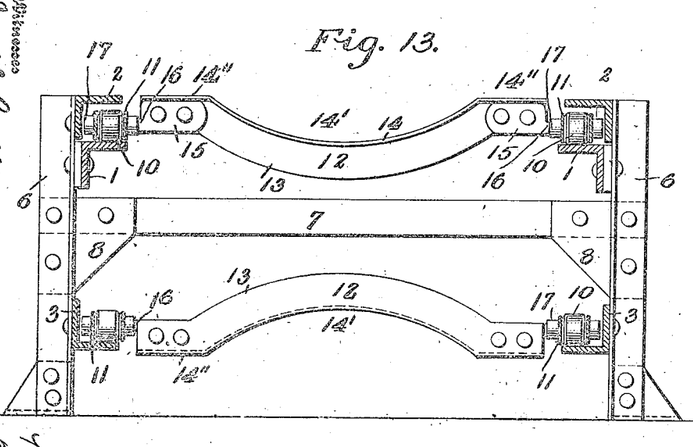
Fig. 13 is a similar view on the line 13—13 of Fig. 14, with the traveling mechanism included.
Figure 15:
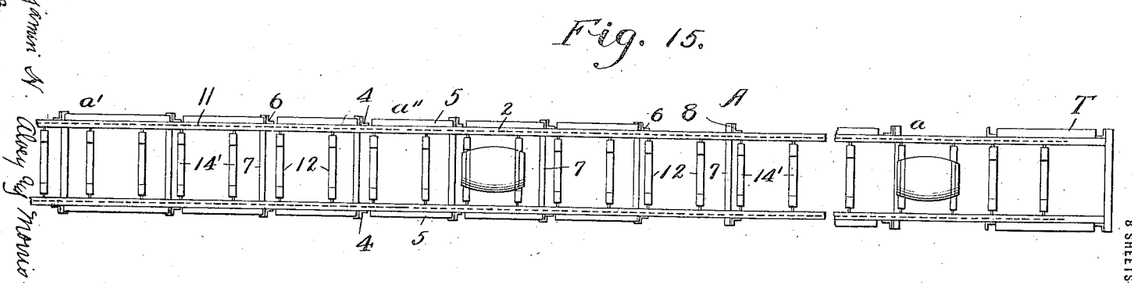
Fig. 15 is a plan view of the same.

The power conveyer A as shown best in Figs. 13, 14 and 15, includes a frame which preferably is of truss formation, being herein shown as having each side formed of upper members 1 and 2 and lower members 3, connected with each other by perpendicular and diagonal braces 4 and 5 respectively, in order that the frame may be both light and strong. This frame is supported at proper intervals by standards 6, and its two sides are connected with each other by transverse braces 7 riveted to plates 8 which are also riveted to the standards 6.

Each member 1, 2 and 3 is preferably of angle formation and is riveted to the standards and braces. The members 1 and 3 form tracks upon which the wheels 10 of the carrier chain 11 travel, and the members 2 form guards to the chains and wheels and also ways which extend longitudinally of the horizontal portions of the power conveyer and upon which the barrels may roll onto and off from the carriers 12, laterally to and from the receiving and discharging sections of the power conveyer.

Each of the carriers is preferably composed of angle formation (preferably L-shaped in cross section) to provide a member 13 by which it may be connected to the carrier chains and a second relatively-broad member 14 to engage the barrel. Said second member is depressed between the ends of the carriers or otherwise suitably formed to provide a pocket 14' of a size and shape adapted partially to encircle a barrel lying therein, and the ends 14'' of the second member are of plain formation and arranged approximately in the same horizontal plane as the guards 2 so as to form with the guards ways leading to and from the pockets 14'. Each carrier is connected to the carrier chains 11 by plates 15 which are riveted to the ends of the member 13 and extend to the contiguous ends 14'', and are provided with laterally projecting shafts 16 which engage the links and wheels of the carrier chains 11 and may be provided with nuts 17 or other suitable confining devices. In practice ball or roller bearings may be provided upon the shafts 16, if desired, but they are not shown herein as they form no necessary part of the conveyer.

Figure 16:
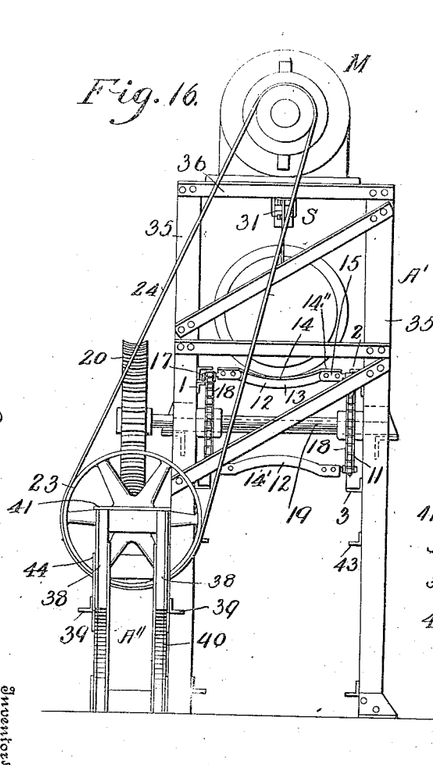
Fig. 16 is an end elevation of the power conveyer.

The chains 11 run over suitable sprockets, of which those at the driving end of the conveyer are designated 18 (see Figs. 16 and 17) while those at the other end are designated 25. The sprockets 18 are mounted on a shaft 19 provided with a gear 20 which meshes with a worm 21 mounted on a shaft 22 having a pulley 23 connected by a belt 24 with a driving motor M, herein shown as electric. The sprockets 25 are mounted on a shaft 26 provided with a take-up mechanism of any suitable form, designated generally by the character T.

It will be observed that the barrels roll over the guards 2 and thence onto the carriers and into the pockets of the latter, lying therein lengthwise of the carrier, and cannot accidentally roll laterally out of the pockets while they may be readily shoved therefrom. These carriers are preferably arranged in such relation with each other that two of them conjointly support the barrel, one at each end of the barrel, or at each side of the central or bulging portion of the latter. The pockets or depressions 70 partially encircle the ends of the barrels, and are preferably of less length than the diameter of the widest part of the barrel and hence the barrel is prevented from sliding off the carrier in the travel of the latter along the inclined section of the conveyer.

Figure 17:
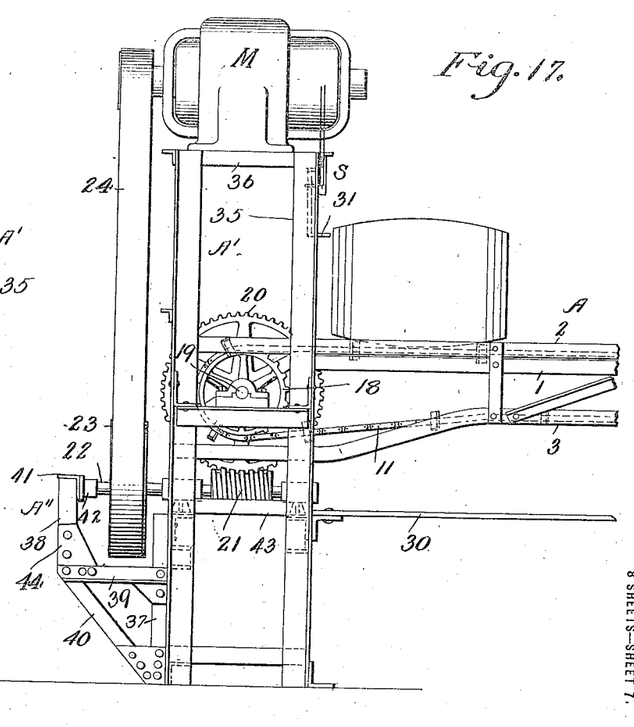
Fig. 17 is a side elevation of the end of the power conveyer.

As indicated most clearly in Figs. 1, 2 and 17 the power conveyer is provided with a running board 30 upon which the attendant stands and moves while manipulating the motor and manually forcing the barrel from the power conveyer to the discharging element C.

A very important feature of the present invention is in the provision of means whereby the barrel is automatically prevented from traveling beyond a predetermined place on the power conveyer. In the illustrated embodiment of the invention this is accomplished by providing means for automatically stopping the travel of the conveyer under the control of a barrel which remains on the conveyer until it has reached the predetermined point beyond which it is not desirable to have it proceed. This means comprises a shifting lever which is so connected with the driving mechanism as to throw the latter out of operation when it is engaged by the barrel. When the driving mechanism comprises an electric motor M the shifting lever, designated 31 in Fig. 17, is suitably connected with, or forms part of, a switch S arranged in the circuit to the motor and adapted to break said circuit when the lever 31 is pressed by the barrel. The switch S may be of any construction adapted to the purpose in view and is here shown as an ordinary split electric switch having an actuating lever extending into the path of the barrel being conveyed.

Figure 18:
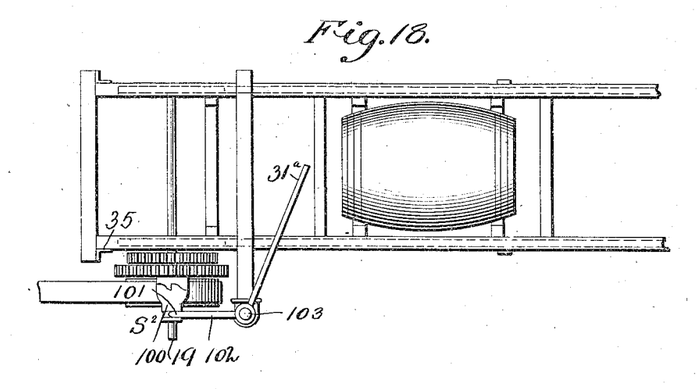
Figs. 18 and 19 are a plan and an elevation, respectively, of a different means for stopping the mechanism under control of the article conveyed.
Figure 19:
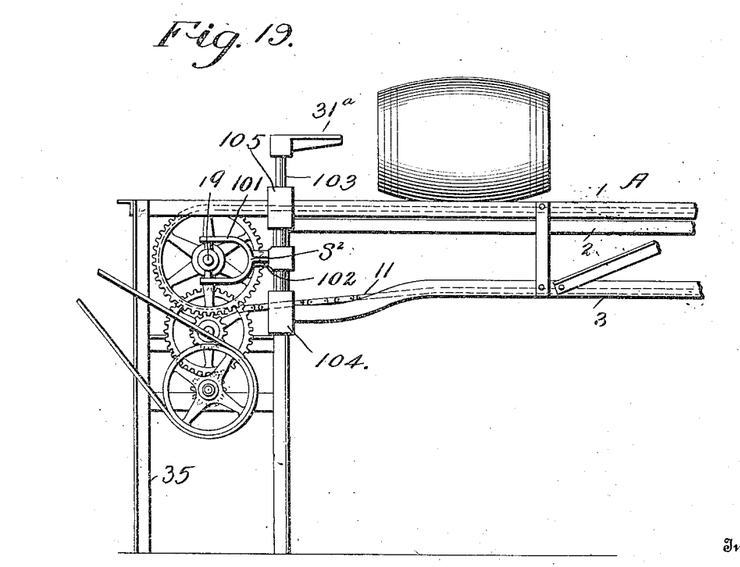

When the driving mechanism is of other than electrical nature the shifting lever may desirably actuate a clutch mechanism, as shown in Figs. 18 and 19, in which the lever is designated $31^a$ and the clutch is designated $S^2$. The clutch is preferably mounted on the shaft 19, with its movable element 100 engaged by a yoke 101 mounted on the end of a lever 102 which is connected to a shaft 103. This shaft 103 has its bearings in the frame of the conveyer at 104 and 105 and is connected to the lever $31^a$ and transmits movement from the latter to the lever 102.

It will be observed that the frame A' at the driving end of the power conveyer is composed of a series of uprights 35 which support a platform 36 arranged at the upper end of the frame; and that there is secured to the side of the frame A' a second frame or support A″ which is composed of two pairs of standards 37 and 38 which are spaced apart and connected by horizontal bars 39 extending from the lower end of each standard 38 to the contiguous standard 37, and are also connected and braced by diagonal rods or arms 40 which extend from the lower ends of the members 38 to the lower ends of the members 37. The upper ends of the pair of members or standards 38 are connected with each other by a member 41 which is provided with a bearing 42 for the outer end of the worm shaft 22 and said shaft is also journaled in bearings in the uprights 35 of the frame A′. The worm is arranged between said uprights and its pulley 23 is arranged between the frame A′ and the members 38 of the support A″. The standards 35 are preferably composed of angle iron suitably spaced apart and braced by transverse members 43 and the several members of the frame A″ are preferably secured together at their places of juncture by plates 44, as shown.

As already stated the gravity ways $b$, $b'$, $c$, $c'$ and $c''$ are of peculiar construction, and are variously supported. These features will now be described, reference being made particularly to Figs. 1, 4, 5, 6, 8, 9, 10 and 11 of the drawings.

Each way or section $b$, $c$, $c'$ and $c''$ of the delivering and discharging elements B and C is composed of a pair of longitudinally extending side members 50 which have their upper surfaces inclined transversely toward each other. These members 50 are preferably of angle formation though in some instances round rods may be usefully employed. They are spaced apart sufficiently to be engaged by the portions of the barrels on opposite sides of the bulge, and they are suitably braced and supported.

Figure 8:
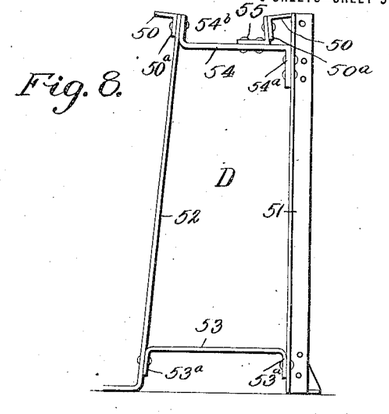
Fig. 8 is a detail of one of the stands preferably used at the junctions of skids or skid-sections arranged at an angle with each other.

The stand which is preferably used at the junctions of ways which are arranged at right angles with each other, as for example, at the junction of a way $c$ with the way $c'$, as shown in Fig. 8. This stand comprises a pair of legs 51 and 52, connected with each other near the bottom by a brace rod 53 having flanges 53$^a$ and near the top by a tie rod 54, having flanges 54$^a$ and 54$^b$. The leg 51 is of angle formation, and has one of its members secured to the adjacent flanges 53$^a$ and 54$^a$, while the other leg, 52, may be of plain formation and is secured to the adjacent flanges 53$^a$ and 54$^b$, and is also riveted to a member (50$^a$) of the angle-side 50 of the way $c'$, or is otherwise suitably secured to the adjacent side of the way $c'$. The other side of the way $c'$ is here shown as secured to an angle piece 55 which is mounted on and secured to the brace 54 and to a member 50$^a$ of said side. The member 51$^a$ affords a means by which the end of the contiguous way or section $c$ (for example) is secured to this stand D, as hereinafter fully set forth. These stands D are arranged at intervals along the length of the way $c'$ and in pairs, as indicated clearly in Figs. 3 and 4.

Figure 9:
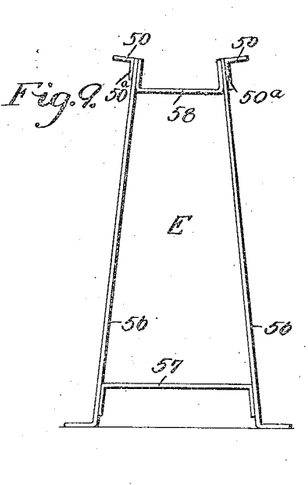
Fig. 9 is a similar view of one of the stands which is preferably used at other places in the lengths of the skids or skid-sections.
Figure 10:
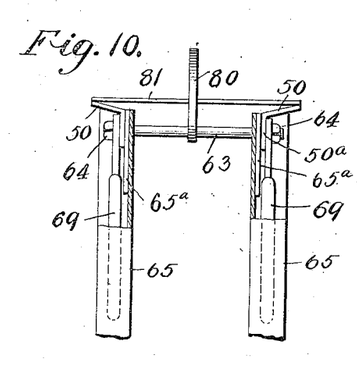
Fig. 10 is an end view of one of the skids or skid-sections.

The stands which are employed at places other than junctions of different ways are designated E and one is shown in detail in Fig. 9, upon reference to which it will be seen that it is composed of a pair of supporting legs 56, tied together near the bottom by a flanged brace 57 and near the top by a flanged brace 58. The sides 50 of the way are secured to the flanges of the latter brace and to the upper ends of the legs 56, which are here shown as arranged between the flanges of the brace 58 and the members 50$^a$ of said sides.

Figure 6:
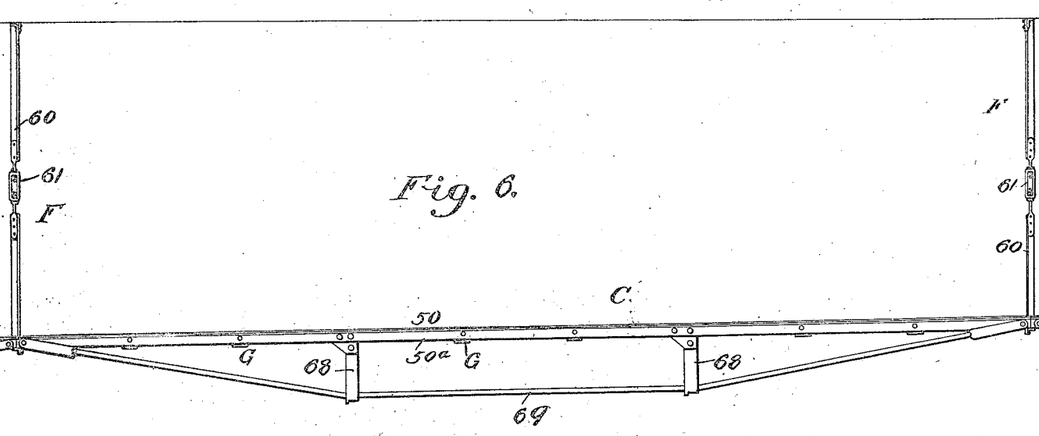
Fig. 6 is a similar view of a skid-section suspended from hangers.
Figure 11:
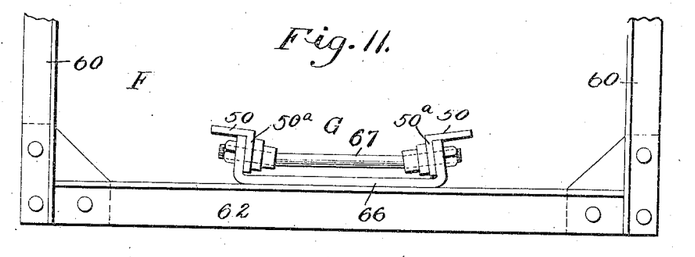
Fig. 11 is a detail view of the lower portion of one of the hangers for supporting a skid or skid-section.
Figure 12:
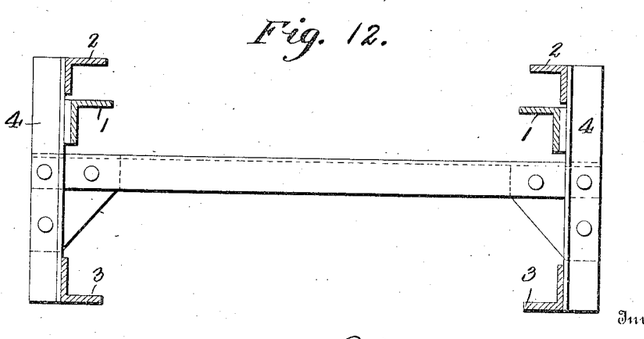
Fig. 12 is a cross-section through the power-conveyer with the traveling mechanism omitted.

The way $c$ has some of its sections supported partly or wholly by hangers F shown in Figs. 6 and 11. Each of these hangers is preferably provided with supporting rods 60 preferably made in sections and having their contiguous ends connected by turn buckles 61, or other means which permit adjustment of the length thereof; and the lower ends of the rods are connected with each other by a member 62 which forms a seat for the abutting ends of two sections of the way $c$. One hanger thus supports contiguous ends of two sections of a way.

Figures 3, 4:
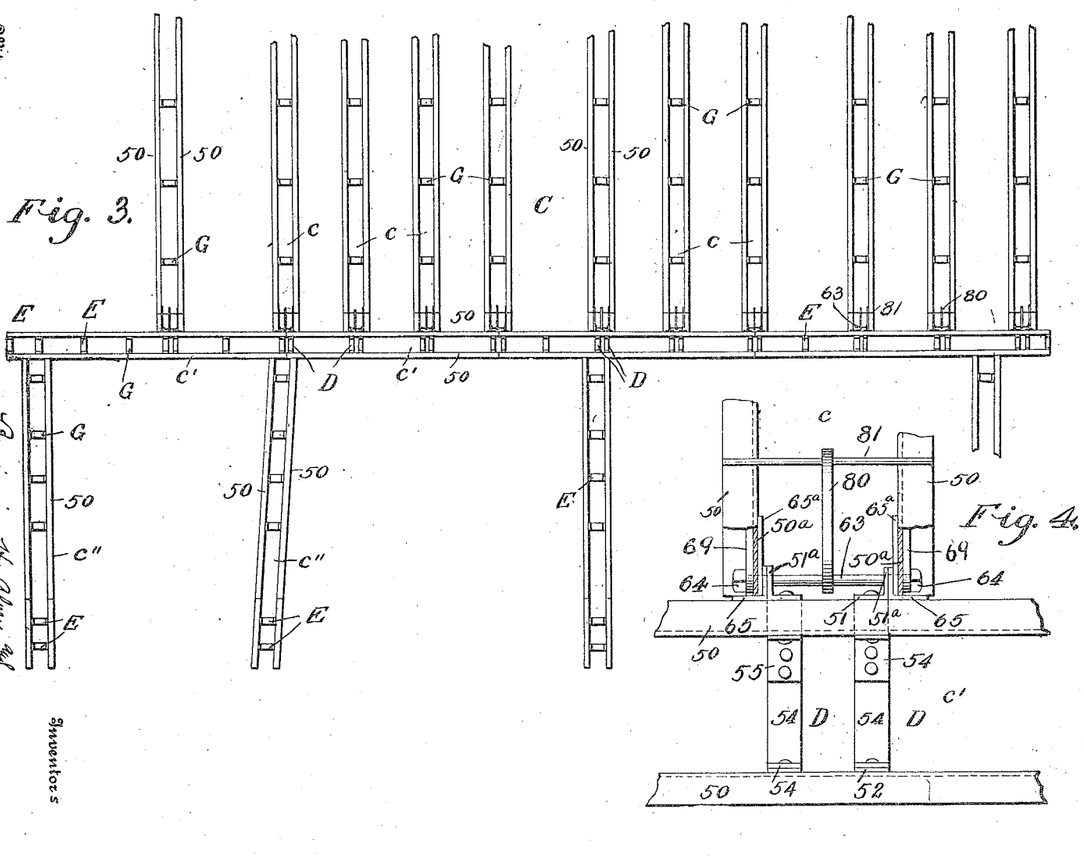
Fig. 3 is a view, drawn to a larger scale than the preceding views, showing the relative arrangement of skids which transfer the kegs from the power conveyer to the storage or shipping departments.
Fig. 4 is a detail view drawn to a still larger scale and showing in plan the manner of interconnecting longitudinal and transverse skids or sections.
Figure 5:
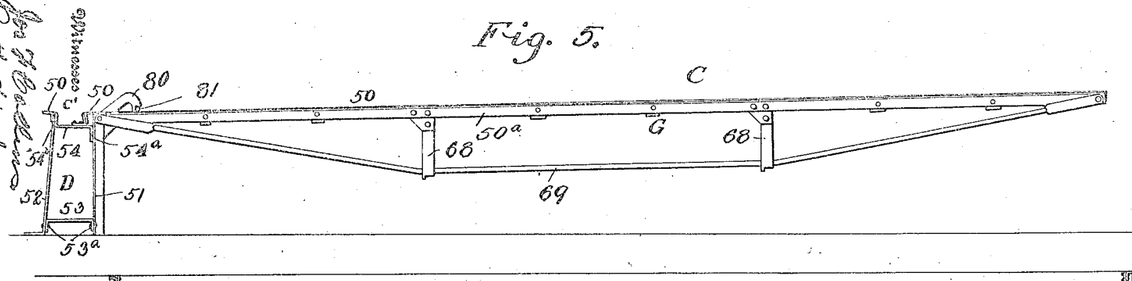
Fig. 5 is a side view of a section of a skid and a supporting stand therefor.

Similarly one stand D supports the contiguous ends of two way-sides 50 located at an angle with each other, as shown most clearly in Fig. 4. Upon reference to this figure and to Fig. 8, it will be seen that the adjacent side 50 of a way $c$, for example, is mounted upon a rod or bolt 63 which extends across the way through the members 50$^a$ of the sides thereof and through the members 51$^a$ of the legs 51. This rod or bolt is provided with nuts or other confining devices 64 whereby it may readily be removed and replaced to permit the ways to be easily assembled and disassembled. Upon this rod or bolt the end of the way $c$ is thus pivotally mounted to permit its grade to be adjusted. An angle plate 65 is preferably employed at each junction of a side of a way $c$ and $c'$. Each of these angle plates has one of its members secured to the members 51$^a$ of the contiguous stand D, while its other member engages the edges of the sides 50 of the ways $c$ and $c'$. It preferably extends from top to bottom of the member 51$^a$. A wear plate 65$^a$ may be employed if desired between the members 50$^a$ of a side of the way $c$ and the contiguous angle plate 65. These plates, through which the rod or bolt 63 also extends, provide a means for a most substantial connection of the parts with each other.

Any or all of the ways may have their sides tied together at desired places between the stands or other supporting means employed, by bracing or stiffening means designated generally by the letter G. Each of these bracing or stiffening means consists preferably of a strap 66 having flanged ends secured to the contiguous sides 50. They are substantially similar to the straps 54 and 58 hereinbefore referred to. Wherever it is necessary or desirable to do so, tie bolts 67 or other bracing or stiffening devices may also be employed, as shown in Fig. 11.

Figure 7:
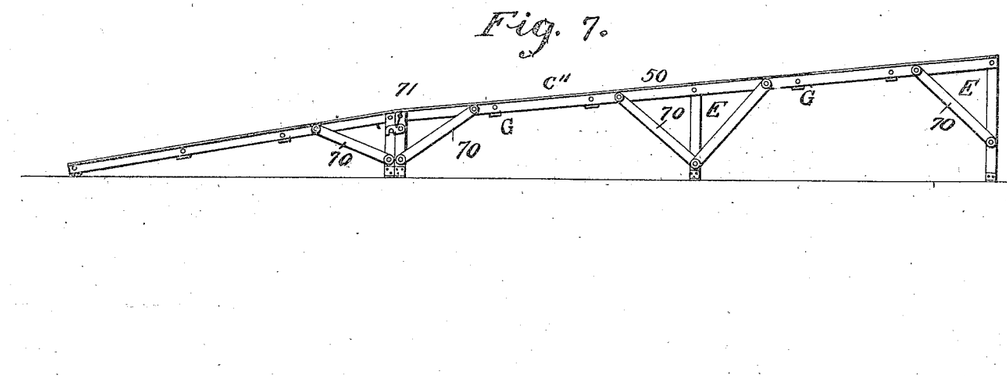
Fig. 7 is a side view of the discharging portion of sections of a skid.

The several sections of the ways c are preferably provided with pendent arms 68 to which truss rods 69 are connected and this may also be true of any or all of the other ways. The ends of these truss rods adjacent to the junction of a way c and c' are shown as mounted upon and secured by the bolt 63. In Fig. 7 we have shown the way c'' as provided with diagonal brace rods 70 extending from the sides of the way sections to the contiguous stand E, in lieu of said truss rods, and we have also shown two sections of said way as removably secured together by hooks 71 secured to the stand E on one section and engaging the similar stand of the other section.

It will be understood that all the ways may be made in sections secured together either permanently or removably as desired.

Upon reference to Figs. 2, 4, 5 and 10 stops 80 will be seen at the discharge ends of the ways c. Each of these stops is adapted to be adjusted into the path of the barrels when it is desired to permit the barrels to collect on its way c. In said figures it is shown as of angle form and pivoted at one end upon the bolt 63 and having its other end engaged with a holding device 81, here shown as a rod removably placed across the way c and adapted to hold the stop in the path of the barrels. The stop is freed by simply pulling the rod from under it and when thus freed its end drops by gravity out of the way of the barrels which thus are permitted to continue their travel to the way e'.

Attention is called to the fact that the bracing or stiffening devices which extend transversely of the sides 50 of the several gravity ways are arranged below the planes of the barrel-supporting surfaces of the latter so as to be at or below (preferably the latter) the plane of the bulge of the barrel.

From the foregoing the construction, operation and advantages of our improved conveying system and of all the elements thereof will readily be seen. It will be apparent that the illustrated system and its details are merely exemplary and are not intended to be interpreted as restrictive, the invention being capable of other uses than that described and may be widely varied in the structure and arrangement of its parts without departing from the spirit of the invention or the scope of the subjoined claims.

It is also intended that the terms applied to the several elements and parts of the structure and the language throughout the entire description and claims shall be interpreted in the sense of being merely illustrative, and not in a restrictive sense, and that the claims are intended to cover all of the severally new features and combinations embodied in the invention and as covering things which, as a matter of language, may be said to fall therebetween.

Having thus described the invention what we believe to be new and desire to secure by Letters Patent is:—

1. In a system for transporting rolling barrels or the like having a greater diameter at the middle than at the end, the combination of a conveyer having means to hold the axes of the barrels in a position parallel to the motion of the conveyer, means forming a way leading to said conveyer and constituting a guide for the barrels as they are rolled to the conveyer and whereby they are constrained to a position with their axes substantially parallel with the motion of the conveyer at the place of delivery onto the conveyer.

2. In a system for transporting rolling barrels or the like having a greater diameter at the middle than at the end, the combination of a conveyer having means to hold the axes of the barrels in a position parallel to the motion of the conveyer, means forming a way leading to said conveyer and constituting a guide for the barrels as they are rolled to the conveyer and whereby they are constrained to a position with their axes substantially parallel with the motion of the conveyer at the place of delivery onto the conveyer, and a second way constituting a guide for the barrels as they are rolled from the conveyer whereby they are constrained to a position with their axes substantially parallel with the motion of the conveyer.

3. In a system for transporting barrels and the like, the combination of a conveyer having means to hold the barrels in a position parallel with the motion of the conveyer and means forming a way leading to and discharging upon said conveyer and comprising spaced elements engaging the barrel upon opposite sides of the bulge to guide the barrel to the conveyer and so disposed as to discharge the barrel upon the conveyer with its axis substantially parallel with the motion of the conveyer.

4. In a system for transferring barrels and the like in a lying position, the combination of a conveyer having a means to hold the axis of the barrel in a position substantially parallel with the motion of the conveyer, and a barrel conducting means whose end adjacent the conveyer forms a way disposed laterally with relation to the conveyer and holds a barrel with its axis substantially parallel to the motion of the conveyer.

5. In a system for transferring barrels and the like in a lying position, a conveyer comprising traveling barrel-carrying means for transporting lying barrels disposed with their axes substantially parallel with the motion of said means, the conveyer also having a frame, combined with a pair of members extending off from a common side of the frame at different places in the length thereof, said members being spaced to engage a barrel at opposite sides of the bulge of the latter and forming a barrel way which holds the barrel with its axis substantially parallel with the motion of the conveyer, braces extending transversely of the way below the bulge of the barrel, and supporting means attached to said braces and members.

6. In a system for transferring barrels and the like, a frame and traveling means for transporting barrels longitudinally of the frame, combined with a pair of members extending off from a common side of the frame at different places in the length thereof, said members being arranged to engage a barrel near the opposite ends thereof and having broad barrel-engaging faces inclined toward each other and said traveling means including barrel engaging elements which move longitudinally of the frame and across the space between said members and receive and convey barrels which are disposed longitudinally of the frame in a lying position.

7. In a system for transferring barrels or the like, a power conveyer comprising a frame, endless traveling means movable longitudinally of said frame and barrel carriers connected to said endless traveling elements, combined with a means arranged to conduct barrels or the like relatively to the power conveyer, said means having its end arranged with relation to the conveyer so that the barrels will move over the side of the frame and over the endless traveling means in their travel between said means and the carrier, and means interposed between the conducting means and the endless traveling means for guarding the latter in the travel of the barrels thereover.

8. In a system for transferring barrels or the like, a power conveyer comprising a frame provided with an approximately horizontal end, said conveyer having means for transporting lying barrels disposed longitudinally of the conveyer, said means including endless traveling elements movable longitudinally of the frame and barrel-carriers connected to said endless traveling elements and arranged to transport lying barrels disposed longitudinally of the conveyer, combined with a means forming a gravity way for conducting barrels relatively to the power conveyer, said gravity way being arranged to support barrels in a lying position disposed crosswise thereof and having its end so disposed with relation to the horizontal end of the conveyer that the barrels will move over the side of the latter and over the endless traveling element in their travel between the gravity way and carriers, and said frame having a guard which extends longitudinally thereof over the traveling element and forms a part of the track for the barrels traveling between the conveyer and the carriers.

9. In a system for transferring barrels or the like, a frame, means forming a way for rolling barrels, said way being operatively related to a side of the frame and extending at an angle therewith, spaced barrel-carrying elements extending transversely of the frame and arranged to support a barrel which lies on the same and extends longitudinally of the frame, said elements being relatively disposed to engage the barrels on opposite sides of its bulge, and means for imparting traveling movement to said elements in the direction of the length of the frame and transverse to the end of the way.

10. In a system for transferring barrels or the like, a frame, means forming a way for rolling barrels, said way being operatively related to a side of the frame and extending at an angle therewith, spaced barrel-carrying elements extending transversely of the frame and arranged to support a barrel which lies on the same and extends longitudinally of the frame, said elements being relatively disposed to engage the barrel on opposite sides of its bulge, means for imparting traveling movement to said elements in the direction of the length of the frame and transverse to the end of the way, said element having plane ends at the side toward said way and also having pockets to receive the barrel, and means forming a bed across which the barrel is rolled in its passage from the way to said elements.

11. In a system for transferring barrels or the like, a frame, means forming ways for rolling barrels, said ways being operatively related to the frame at different places in the length of the latter and respectively serving to convey the barrels to and from the frame, combined with spaced barrel-carrying elements which are arranged transversely of the frame and travel longitudinally thereof between the ways and across the ends of the latter, said elements being relatively so constructed and arranged as conjointly to support a barrel lying on the same and to engage the barrel on opposite sides of its bulge, and means between said conveying elements and the ways across which the barrels are adapted to roll in their passage between the ways and conveying elements.

12. In a system for transferring barrels or the like, a frame, means forming ways for rolling barrels, said ways being operatively related to the frame at different places in the length of the latter and respectively serving to convey the barrels to and from the frame, combined with spaced barrel-carrying elements which are arranged transversely of the frame and travel longitudinally thereof between the ways and across the ends of the latter, said elements being relatively so arranged as conjointly to support a barrel lying on the same and to engage the barrel on opposite sides of its bulge, and having plane ends and depressed portions between their ends, the depressed portions forming seats for the barrel and the plane ends forming surfaces over which the barrel may be rolled to or from said seats, and means forming a surface over which the barrel may roll in its passage between the way and barrel-carrying elements.

13. In a system for transferring barrels or the like, a frame having a guard, endless traveling devices one of which runs under said guard, and a pair of barrel supports each having a plain end approximately in the plane of said guard, said supports being carried by the endless traveling devices and having pockets and being disposed in such relative positions as conjointly to support a barrel lying on the same and to engage the ends of the barrel on opposite sides of its bulge, combined with means for conducting the barrels relatively to the frame, said means having its end arranged adjacent to said guard and so related thereto that the barrel will roll over said guard and plane ends of the supports in its travel between the pockets and conducting means.

14. In a system for transferring barrels or the like, a frame, means forming a way for rolling barrels, said way being operatively related to a side of the frame and extending at an angle therewith, spaced barrel carrying elements extending transversely of the frame and constructed and arranged conjointly to support a barrel lying on the same and to engage the barrel on opposite sides of its bulge, each of said elements being of angle-formation with a broad side presented to the barrel, and means arranged to impart traveling movement to said elements in the direction of the length of said frame and transverse to the end of the way.

15. In a system for transferring barrels or the like, a frame, means forming a way for rolling barrels, said way being operatively related to a side of the frame and extending at an angle therewith, spaced barrel carrying elements extending transversely of the frame and arranged conjointly to support a barrel lying on the same and to engage the barrel on opposite sides of its bulge, each of said elements being of angle-formation with a broad side presented to the barrel, and each having a depressed barrel-receiving portion and a plane end, the plane end forming a surface over which the barrel may be rolled in its passage between the depressed portion and the end of the way, and means for imparting traveling movement to said elements in the direction of the length of said frame and transverse to the end of the way.

16. In a system for transferring barrels or the like, a frame, means forming a way for rolling barrels, said way being operatively related to a side of the frame and extending at an angle therewith, spaced barrel carrying elements extending transversely of the frame and arranged conjointly to support a barrel lying on the same and to engage the barrel on opposite sides of its bulge, each of said elements being of angle-formation with a broad side presented to the barrel, and each having a depressed barrel-receiving portion and a plane end, the plane ends of said elements forming a surface over which the barrel may be rolled in its passage between said depressed portions and the end of said way, and means for imparting traveling movement to said elements in the direction of the length of said frame and transverse to the end of the way, said means having endless traveling elements and said frame having means forming tracks for said endless traveling elements and also having a guard for an endless traveling element, said guard extending over the endless traveling element and being arranged between the ends of the way and the plane ends of the barrel-carrying elements and forming a surface over which the barrel may be rolled in its passage between said ends.

17. In a system for transferring barrels or the like, a frame, means forming ways for rolling barrels, said ways being operatively related to the frame at different places in the length of the latter, and respectively serving to convey the barrels to and from the frame, combined with spaced barrel-carrying elements which are arranged transversely of the frame, and means comprising endless traveling elements for causing said barrel-carrying elements to travel longitudinally of the frame between the ways and across the ends of the latter, said barrel-carrying elements being relatively so arranged as conjointly to support a barrel lying on the same and to engage the barrel on opposite sides of its bulge, and each being of angle-iron formation with a broad-side presented to the barrel and having plane ends and a concave intermediate portion, and said frame having means which form tracks for the endless traveling elements and guards arranged over the endless traveling elements and between the ends of the ways and the plane ends of the barrel-carrying elements.

18. In a system for transferring barrels and the like, a frame, traveling means for carrying the barrels longitudinally of the frame, said means being constructed to support the barrels in a lying position, and a running board extending longitudinally of the frame and arranged at the discharge end thereof, combined with a plurality of conducting means extending from a side of the frame and having their receiving ends opposite the running board; the frame, traveling barrel-carrying means and conducting means being relatively arranged to permit an attendant on the running board to roll the barrel from the carrying means and over the side of the frame to the particular conducting means leading to its predetermined destination when it reaches a place adjacent to said conducting means.

19. In a system for transferring barrels and the like, a frame and means traveling longitudinally of the frame and constructed and arranged to carry a barrel in a lying position and to permit the latter to be rolled laterally therefrom by an attendant at the discharge end of the conveyer, combined with a plurality of conducting means leading from the discharge end of the frame to different destinations, said conducting means having their receiving ends arranged side by side and operatively related to the same side of the discharge end of the conveyer and in position to receive the barrels rolled from the carriers.

20. In a system for transferring barrels or the like, a frame and spaced carriers which travel longitudinally of the frame and extend transversely thereof and are constructed and arranged to transport lying barrels disposed longitudinally of the frame, combined with a gravity way which extends laterally to said frame and is composed of longitudinal members which are spaced to engage the barrel near the opposite ends thereof and have ends operatively related to a side of the frame.

21. In a system for transferring barrels and the like, a frame and traveling means arranged to transport barrels longitudinally of the frame, combined with a series of members extending off from a common side of the frame at different places in the length thereof, said members being arranged in pairs, each pair correlated to form a gravity barrel way whose members engage the barrels near opposite ends of the latter and said traveling means being constructed to support barrels which are disposed longitudinally of the frame in a lying position.

22. In a system for transferring barrels and the like, a frame and traveling means for transporting barrels longitudinally of the frame, combined with a pair of members extending off from a common side of the frame at different places in the length thereof, said members being arranged to engage a barrel near the opposite ends thereof and having broad barrel-engaging faces inclined toward each other and said traveling means including barrel engaging elements which move longitudinally of the frame and across the space between said members and receive and convey barrels which are disposed longitudinally of the frame in a lying position.

23. In a system for transferring barrels and the like, a frame, traveling means for transporting barrels longitudinally of the frame, combined with a pair of members extending off from a common side of the frame at different places in the length thereof, said members being arranged to engage a barrel near the opposite ends thereof and forming a barrel way, braces extending transversely of the way at or below the plane of the bulge of the barrel, and supporting means attached to said braces and members, said traveling means including barrel engaging elements which move longitudinally of the frame and across the end of the barrel way and receive and convey barrels which are disposed longitudinally of the frame in a lying position.

24. In a system for transferring barrels and the like, a frame, means which travel longitudinally of the frame for receiving and transporting lying barrels which are disposed longitudinally of the frame, combined with a pair of members extending off from a common side of the frame at different places in the length thereof, said members having broad surfaces to engage the barrels and said surfaces being inclined toward each other, transversely arranged braces connecting said members with each other and arranged at or below the plane of the bulge of the barrel, and supporting means attached to said braces and members.

25. In a system for transferring barrels and the like, a frame and means for transporting longitudinally of the frame barrels which are in a lying position and disposed in the direction of the length of the frame, combined with a way extending laterally off from one side of the frame at the discharging end thereof and constructed to conduct barrels which are disposed in a lying position crosswise of it, operating mechanism for the traveling means and controlling means for the operating mechanism, having an actuating device arranged to be actuated by the barrel to stop the movement of the traveling means when the barrel has reached a position adjacent to said way.

26. In a system for transferring barrels and the like, a frame and means for transporting longitudinally of the frame barrels which are in a lying position and disposed in the direction of the length of the frame, combined with a way extending laterally off from one side of the frame at the discharging end thereof and arranged to conduct barrels which are disposed in a lying position crosswise of it, a motor, connections between the motor and traveling means for operating the latter, and a controlling means for the motor including a device which is arranged to be operated by the barrel when the latter reaches a position contiguous to the way, said controlling means serving to stop the motor.

27. In a system for transferring barrels, a conveyer comprising endless longitudinally movable traveling elements, barrel supports carried by said endless traveling elements and shaped and disposed to receive and support barrels disposed in a lying position and longitudinally of the line of travel of said endless traveling elements, in combination with a barrel conveying means the discharge end of which leads to the side of said conveyer and is disposed at such an elevation with relation to the conveyer as to discharge barrels directly from the way upon said conveyer.

In testimony whereof we affix our signatures, in presence of two witnesses.

BENJAMIN H. ALVEY.
MORRIS U. BERNHEIM.

Witnesses:
RAY E. WORRALL,
E. GOUHARDT.